US011164375B1

(12) United States Patent
Grover et al.

(10) Patent No.: US 11,164,375 B1
(45) Date of Patent: Nov. 2, 2021

(54) STEREOSCOPIC RENDERING OF NON-FLAT, REFLECTIVE OR REFRACTIVE SURFACES

(71) Applicant: Tanzle, Inc., Scotts Valley, CA (US)

(72) Inventors: Joseph L. Grover, Ben Lomond, CA (US); Oliver T. Davies, Felton, CA (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

(21) Appl. No.: 17/076,454

(22) Filed: Oct. 21, 2020

(51) Int. Cl.
| *G06T 17/20* | (2006.01) |
| *G06T 15/04* | (2011.01) |
| *H04N 13/344* | (2018.01) |
| *G02B 27/01* | (2006.01) |

(52) U.S. Cl.
CPC .......... *G06T 17/20* (2013.01); *G02B 27/0172* (2013.01); *G06T 15/04* (2013.01); *H04N 13/344* (2018.05); *G02B 2027/0134* (2013.01)

(58) Field of Classification Search
CPC ....... G06T 17/20; G06T 15/04; H04N 13/344; G02B 27/0172; G02B 2027/0134
See application file for complete search history.

(56) References Cited

U.S. PATENT DOCUMENTS

| 6,661,913 B1 * | 12/2003 | Zhang | G06K 9/209 345/419 |
| 9,204,121 B1 * | 12/2015 | Marason | H04N 13/296 |
| 10,643,343 B2 * | 5/2020 | Rochette | G06K 9/00214 |
| 10,681,489 B2 * | 6/2020 | Mangiat | G06F 3/167 |
| 11,023,035 B1 * | 6/2021 | Atlas | G06T 19/006 |
| 2003/0231173 A1 * | 12/2003 | Matusik | G06T 17/20 345/419 |
| 2010/0039296 A1 * | 2/2010 | Marggraff | G06F 3/03545 341/20 |
| 2013/0272677 A1 * | 10/2013 | Tsuda | H04N 9/8205 386/248 |
| 2016/0171814 A1 * | 6/2016 | Froy, Jr. | G07F 17/3276 463/20 |
| 2017/0108702 A1 * | 4/2017 | Rabner | G02B 27/027 |
| 2018/0005415 A1 * | 1/2018 | Wang | G06T 11/006 |
| 2019/0287495 A1 * | 9/2019 | Mathur | G06T 15/00 |

(Continued)

*Primary Examiner* — Abderrahim Merouan
(74) *Attorney, Agent, or Firm* — David R. Stevens; Stevens Law Group

(57) ABSTRACT

A computer program product may cause one or more processors to generate stereoscopic images of one or more 3D models within a 3D model space. As part of the generation of the stereoscopic images, special case surfaces that are non-flat and specularly reflective or refractive are rendered in a special manner. The special manner involves rendering a texture for the special case surface based on a third projection corresponding to a third viewpoint that is spaced from both a first viewpoint (i.e., a left eye viewpoint) and a second viewpoint (i.e., a right eye viewpoint). Accordingly, when rendering first and second images (i.e., images corresponding respectively to the first and second viewpoints), the texture corresponding to the third viewpoint may be applied to the special case surface in both the first and second images. As a result, the disparity between the stereoscopic images may be low enough that the special case surface may be readily fused by the human viewer and not become a visual problem or an area of unwanted visual focus for the viewer.

20 Claims, 12 Drawing Sheets

(56) References Cited

U.S. PATENT DOCUMENTS

| | | | |
|---|---|---|---|
| 2020/0107005 A1* | 4/2020 | Katz | H04N 13/128 |
| 2020/0265594 A1* | 8/2020 | Aguirre-Valencia | G06F 3/012 |
| 2020/0265618 A1* | 8/2020 | Chen | A61B 34/10 |
| 2021/0019939 A1* | 1/2021 | Hu | G06T 19/20 |
| 2021/0027456 A1* | 1/2021 | Moteki | G06T 7/543 |
| 2021/0082084 A1* | 3/2021 | Baldus | G06F 3/04842 |
| 2021/0133413 A1* | 5/2021 | Takao | G06K 7/1417 |
| 2021/0158715 A1* | 5/2021 | Kim | G06F 17/18 |

* cited by examiner

☐ Fragment Rendered for First Viewpoint
▨ Fragment Rendered for Modified First Viewpoint (e.g., Buffer Fragment)
▧ Fragment Rendered for Third Viewpoint

STEREOSCOPIC RENDERING OF NON-FLAT, REFLECTIVE OR REFRACTIVE SURFACES

BACKGROUND

1. Field of the Invention

This invention relates to computerized production of stereoscopic images and, more particularly, to novel systems and methods for rendering stereoscopic images of surfaces that are non-flat and reflective or refractive.

2. Background Art

Ever since humans began to communicate through pictures, they have faced the dilemma of how to accurately represent the three-dimensional (3D) world around them. Most attempts in this regard have involved "flattening" the 3D world onto planar surfaces (e.g., paintings, drawings, tapestries, etc.). Such two-dimensional (2D) pictures must provide a number of visual cues to the brain to create the illusion of depth. However, this illusion is realistically achievable due to the fact that the brain is accustomed to using 2D images to create a sense of depth.

The 3D real world is always and already perceived as 2D images at the retina, a concave surface at the back of the eye. From this 2D image, the brain, through experience and perception, can generate depth information and visually perceive that third dimension. This may be accomplished via two types of depth cues, namely monocular (one eye perception) and binocular (two eye perception).

Since the first half of the nineteenth century, stereoscopic viewing devices have been developed to create a more robust illusion of depth. In recent decades, 3D capable electronics and computing hardware devices and real-time computer-generated stereoscopic images have been a popular area of computer science, with innovations in visual, audio, tactile, and biofeedback systems. Much of the recent research in this area has produced hardware and software products that are specifically designed to generate greater realism and more natural computer-human interfaces. These innovations have significantly enhanced and simplified the end-user's computing experience.

Despite recent advancements in computer-generated stereoscopic images, certain types of surfaces have continued to present problems. While the rendering of certain surfaces can be perceived in a very realistic manner in corresponding stereoscopic images, it may still be difficult for the human brain to satisfactorily or comfortably fuse the depictions of those surfaces together to create an illusion of depth. In such situations, the surfaces may become objects of visual focus or distraction that may degrade a user experience.

What is desired is a system and processing technique for rendering selected types of surfaces.

BRIEF SUMMARY OF THE INVENTION

In view of the foregoing, in accordance with the invention as embodied and broadly described herein, a method and apparatus are disclosed in one embodiment of the present invention to identify certain special case surfaces and render those surfaces differently from other surfaces. A special case surface may differ from other surfaces in that it may be a source of unwanted visual focus or attention, eye strain, or the like in 3D video games, 3D motion pictures, 3D virtual reality experiences, or the like. A special case surface may correspond to all or a portion of a 3D model or model object. In certain embodiments, selected non-flat surfaces that are reflective or refractive (e.g., non-flat surfaces that are tagged within computer memory as exhibiting specular reflection or refraction) may be considered special case surfaces.

In selected embodiments, visual problems corresponding to special case surfaces may be relieved or entirely removed by producing stereoscopic images where any special case surfaces therewithin are depicted in the same way. That is, a first 2D image (e.g., a 2D image to be delivered to a left eye of a viewer) may depict a 3D model as seen from a first viewpoint and a second 2D image (e.g., a 2D image to be delivered to a right eye of a viewer) may depict the 3D model as seen from a second viewpoint that is spaced from the first viewpoint, but a depiction of a special case surface on the 3D model in both 2D images may share the same source.

This may be accomplished by using a depiction of a special case surface as seen from a first viewpoint in the stereoscopic images. Alternatively, a depiction of a special case surface as seen from a second viewpoint may be used in the stereoscopic images. In still other embodiments, a depiction of a special case surface as seen from a third viewpoint may be used in the stereoscopic images. A third viewpoint may be spaced from both a first viewpoint and a second viewpoint. For example, a third viewpoint may be located between a first viewpoint and a second viewpoint.

In selected embodiments, a third viewpoint may be located at a midpoint that is exactly between and collinear with the first and second viewpoints. Accordingly, a depiction of a special case surface corresponding to a third viewpoint may be something like an average of what would be seen from the first and second viewpoints.

By producing stereoscopic images where any special case surfaces therewithin are depicted in the same way, there may be significantly less disparity between the stereoscopic images. In particular, the disparity between the stereoscopic images may be low enough that the special case surfaces therewithin may facilitate stereo image fusion and not become visual problems or an unwanted area of visual focus, eye strain, dizziness, or the like for a viewer when those images are stereoscopically delivered or presented to him or her.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
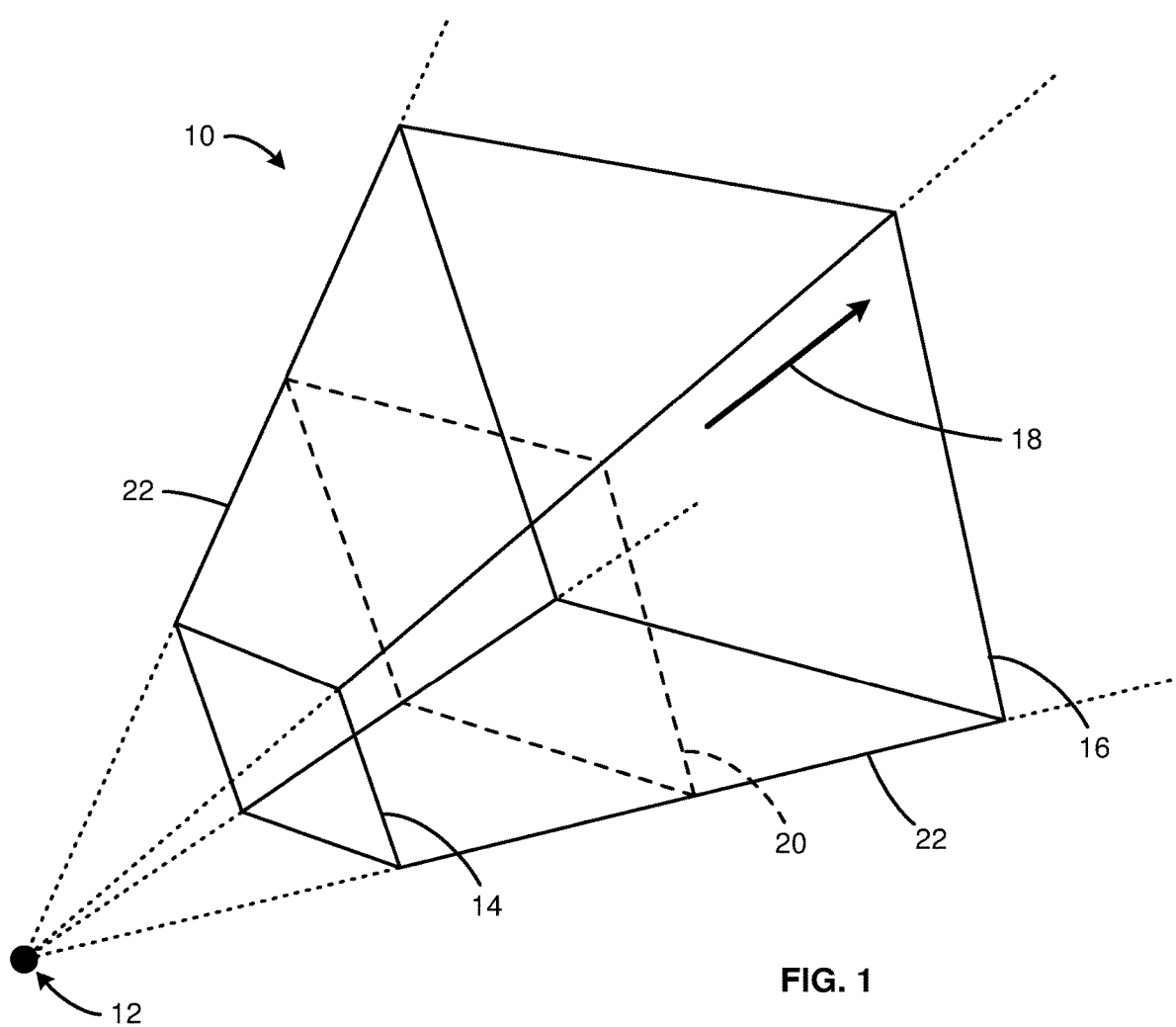
FIG. 1 is a schematic diagram of one embodiment of a viewing frustum corresponding to a single viewpoint in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

In describing selected aspects or components of the present invention, various technical terms may be used. To aid in communicating an appropriate or intended meaning for certain such terms, the following list of terms and corresponding definitions is provided.

Mesh—A mesh is a representation of an object comprising a collection of points in three-dimensional model space that are joined together by lines and known as vertices (vertex being the singular form of vertices) to form multiple polygonal shapes (e.g., triangles or quadrilaterals). Taken together, the multiple polygonal shapes form a surface that simulates or represents the exterior surface of the object. In general, a greater number of points and corresponding higher polygon count may form a finer mesh that more closely or accurately simulates the exterior surface of the object. However, a greater number of points or a higher polygon count may also make a mesh more computationally intensive to render. Accordingly, the granularity of a mesh may be a compromise or balance between the quality of images that can be rendered therefrom and the computational time available for rendering those images.

3D Model—A 3D model is a representation of an object in three-dimensional space. Within the present disclosure, a 3D model may be referred to as a model object or a virtual object. Different modeling processes or schemes may be used to generate or define a 3D model. For example, in certain embodiments, polygonal modeling may be used to generate or define a 3D model. In polygonal modeling, a 3D model may comprise a mesh with one or more surfaces thereof painted and/or textured to improve or complete the visual effect or realism associated therewith. In other embodiments, a 3D model may be generated or defined using curve modeling, digital sculpting, or the like.

3D Model Space—A 3D model space is a three-dimensional space into which one or more 3D models or model objects may be represented or placed. Accordingly, when more than one 3D model is placed within a 3D model space, the 3D models may have relative positions and orientations with respect to one another. A 3D model space may be or define a simulated environment for a 3D video game, a 3D motion picture, 3D virtual reality experience, or the like.

Viewpoint—A viewpoint within the present disclosure has the full extent of its ordinary meaning in the field of computer graphics and cameras and specifies a location, direction, and/or orientation. For example, a viewpoint may refer to a single point of view (e.g., for a single eye) or a pair of points of view (e.g., for a pair of eyes). Accordingly, a "single viewpoint" may specify that the viewpoint refers to only a single point of view, while a "paired viewpoint" or "stereoscopic viewpoint" may specify that the viewpoint refers to two points of view. A viewpoint may correlate to or be a perspective. Accordingly, a user viewpoint may be or define a user perspective.

Virtual Scene—A virtual scene is a view of one or more 3D models within a 3D model space from a viewpoint.

Texture—A texture is an image (e.g., a flat image) that is applied to a 3D model (e.g., applied to a mesh forming the core of a 3D model) to give the 3D model color and detail. Texturing is the process of applying one or more textures to a 3D model.

Render—To render is to use a computer to derive a 2D image capable of being displayed on a display screen from a 3D model space containing one or more 3D models. A rendering process is a process where at least one 2D image is rendered.

Viewing Frustum—A viewing frustum is a three-dimensional region in a 3D model space that may appear in a corresponding 2D image when a virtual scene of the 3D model space is rendered. Defining a viewing frustum enables model culling, wherein computational resources are preserved or used more efficiently by not rendering virtual objects that are completely outside of the viewing frustum. For example, a viewing frustum may extend from an origin point (i.e., a viewpoint) and include a near clipping plane and a far clipping plane that each extend generally perpendicular to a viewing direction, but either or both of the two planes may be offset from perpendicular to a viewing direction. Culling may result in 3D models or partial models located on the near side of a near clipping plane not being rendered on to a render plane (or display plane or projection plane). Similarly, culling may result in 3D models or partial models located on the far side of a far clipping plane not being rendered on to a render plane (or display plane or projection plane). Furthermore, a viewing frustum may include or define sides that bound the perimeters of a near plane and corresponding far plane.

Projection—A projection is a 2D representation of a 3D model. To generate a projection, visual perspective and aspect analysis may be used to project a 3D object onto a projection plane. Rendering typically involves generating a projection for each of one or more 3D models located within a viewing frustum. That is, rendering may involve projecting one or more 3D models onto one projection (or render) plane. Typically, a projection plane is located between a near clipping plane and a far clipping plane of a corresponding viewing frustum. In general, a projection plane, a near clipping plane, and a far clipping plane may all be parallel to each other, though in certain projection conditions (e.g. non-normal projections) a projection plane may not be parallel to near and far clipping planes.

Stereo Display—A stereo display is a display system configured to deliver stereoscopic images to one or more human users. Unlike a normal, monoscopic display, a stereo display displays a right image and a left image. A stereo display ensures that the right image is delivered to only the right eye and that the left image is delivered to only the left eye. This may be accomplished using dual displays or screens where one display or screen is seen by the right eye and another display or screen is seen by the left eye. This technique is used in Head Mounted Displays (HMDs). Alternatively, it may be accomplished with one display or screen that presents interleaved images or parallel images using discrete polarization techniques. In still other systems, it may be accomplished with one display or screen that presents time sequenced images using time sequenced polarization techniques in the display and complementary eyewear. In embodiments using interleaved images, a human user may wear passive or active glasses to sort the appropriate image to the appropriate eye.

Referring to FIG. 1, a viewing frustum 10 in accordance with the present invention may extend away from an origin point (i.e., a viewpoint 12) and include a near clipping plane 14 defining a near boundary of the viewing frustum 10 and a far clipping plane 16 defining a far boundary of the viewing frustum 10. Near and far clipping planes 14, 16 may extend perpendicular to a viewing direction 18. A projection plane 20, which may also be referred to as a render plane 20, may be located between a near clipping plane 14 and a far clipping plane 16 of a corresponding viewing frustum 10. As illustrated, a near clipping plane 14, far clipping plane 16, and projection plane 20 may be parallel to each other. However, in other embodiments or projection conditions (e.g. non-normal projections), a projection plane 20 may not be parallel to near and far clipping planes 14, 16.

Lateral surfaces 22 may define lateral boundaries of a viewing frustum 10. A shape of one or more lateral surfaces 22 may be selected to match or define a shape of a projection plane 20. A projection plane 20, in turn, may match a shape of an intended display screen. For example, a projection plane 20 may have a rectangular shape (e.g., a perimeter that is rectangular) due to the fact that most computer monitors, televisions, movie theaters, and the like have display screens that are rectangular in shape. Accordingly, a viewing frustum 10 may include lateral surfaces 22 (e.g., four lateral planes) that collectively define rectangular lateral boundaries (i.e., boundaries that are rectangular when viewed in any cross section orthogonal to a viewing direction 18).

The various boundaries 14, 16, 22, of a viewing frustum 10 may determine which 3D models or which portions of which 3D models are to be projected onto a projection plane 20 during a rendering process. For example, 3D models or portions of 3D models located on a near side of a near clipping plane 14, a far side of a far clipping plane 16, and/or an outside of one or more lateral surfaces 22 may not be projected onto a projection plane 20 during a rendering process.

Figure 2:
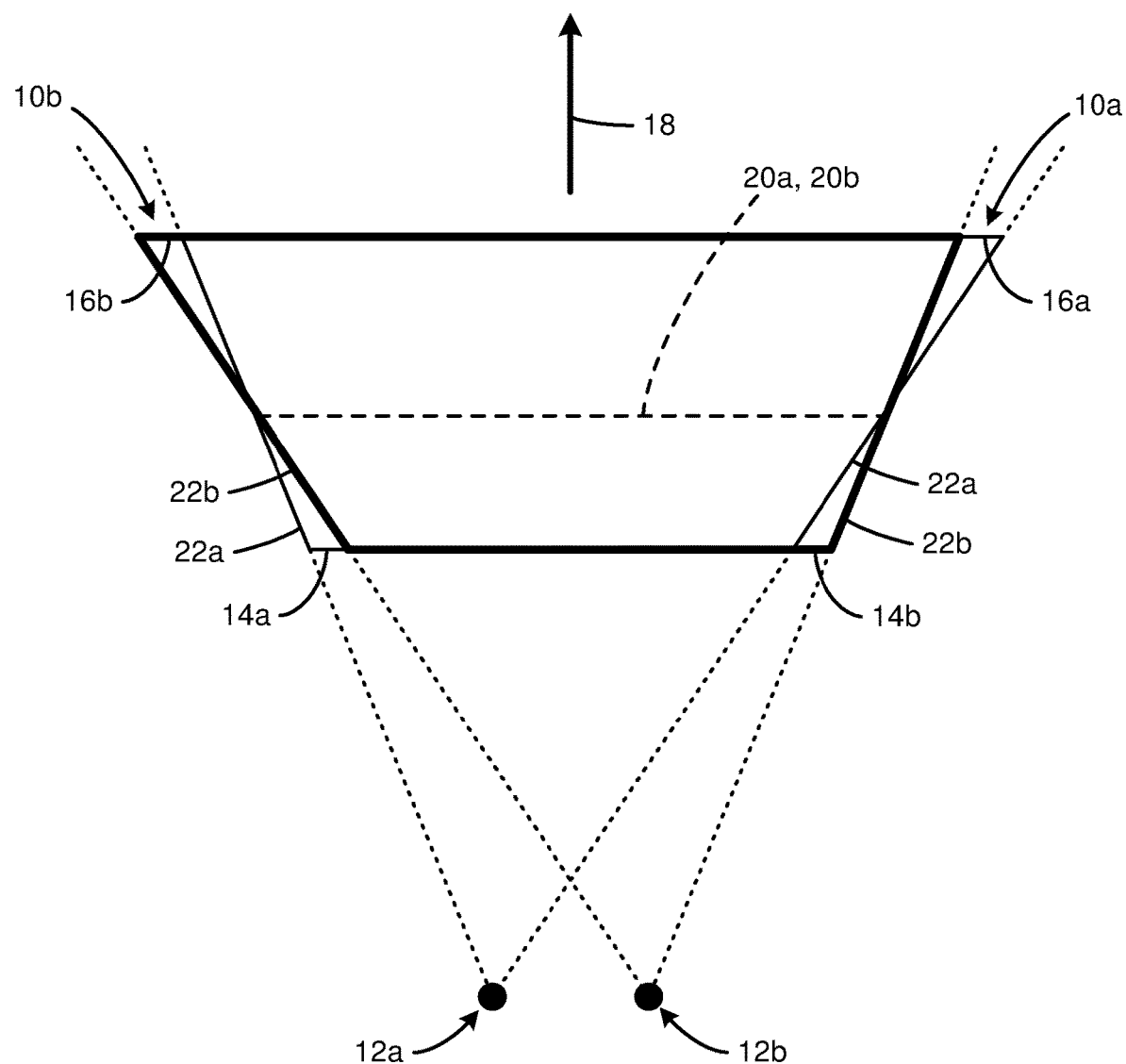
FIG. 2 is a schematic diagram of two viewing frustums that share a common projection plane, wherein one frustum corresponds to a viewpoint of a left eye of a viewer and the other frustum corresponds to the viewpoint of a right eye of the viewer.

Referring to FIG. 2, in stereoscopic systems, different viewpoints 12 may correspond to different viewing frustums 10. However, those different viewing frustums 10 may share a common spatially positioned projection plane 20. For example, in a stereoscopic system, a first viewpoint 12a may correspond to a left eye of a viewer and a second viewpoint 12b may correspond to a right eye of the viewer. Accordingly, a distance between the first viewpoint 12a and the second viewpoint 12b may match a representative human interocular distance. A first viewing frustum 10a may correspond to the first viewpoint 12a. A second viewing frustum 10b may correspond to the second viewpoint 12b. The first and second viewing frustums 10a, 10b may be skewed with respect to each other so that a projection plane 20a corresponding to the one directly overlays (e.g., is identical in shape, size, and location with) a projection plane 20b of the other. This may enable one or more 3D models that are projected onto the respective projection planes 20a, 20b to be stereoscopically viewed and properly interpreted by a human user of a stereoscopic display.

Figure 3:
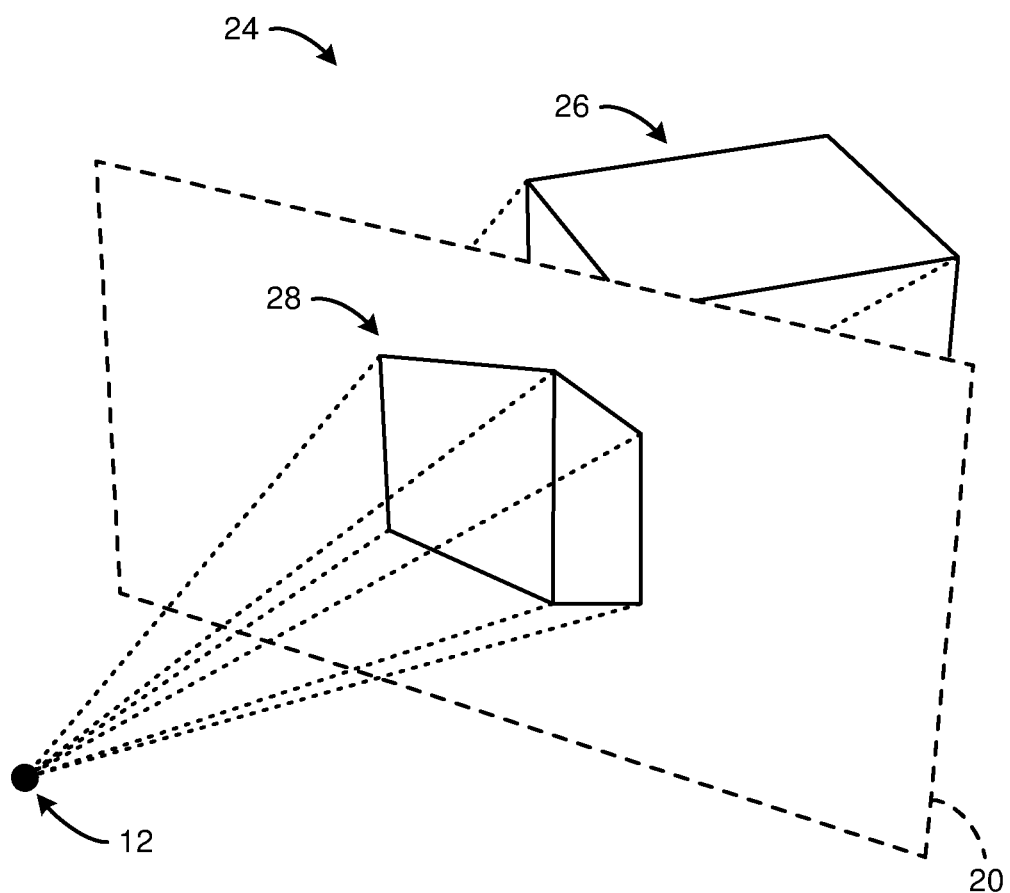
FIG. 3 is a schematic diagram of one embodiment of a 3D model or model object projected from one viewpoint onto a projection plane in accordance with the present invention.

Referring to FIG. 3, a 3D model space 24 may have one or more 3D models 26, model objects 26, virtual objects 26, or the like placed therein. When multiple 3D models 26 are placed within a 3D model space 24, the 3D models 26 may have relative positions and orientations with respect to one another. Additionally, when a viewpoint 12 is placed or selected in a 3D model space 24, one or more 3D models 26 within the 3D model space 24 may have relative positions and orientations with respect to the viewpoint 12. Accordingly, in a rendering process, a 2D image 28 of one or more 3D models 26 may be generated. The 2D image 28 may simulate how an eye, camera, or the like at the viewpoint 12 would perceive the one or more 3D models 26.

A rendering process may involve or include projecting one or more 3D models 26 onto a projection plane 20. One or more 3D models 26 located on a far side of a projection plane 20 may be projected forward onto the projection plane 20. One or more 3D models 26 located on a near side of a projection plane 20 may be projected rearward onto the projection plane 20.

Figure 4:
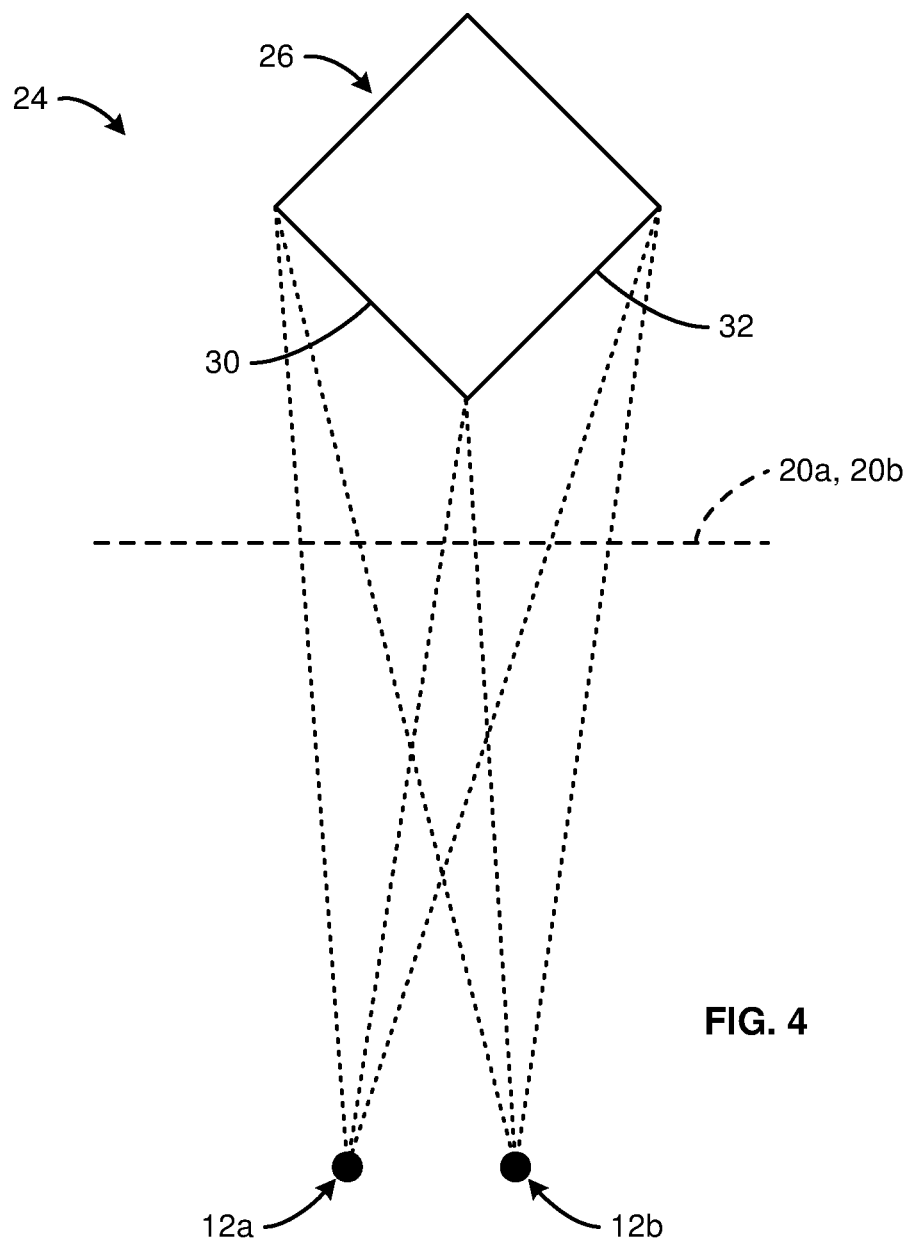
FIG. 4 is a schematic diagram of the 3D model of FIG. 3 projected from two viewpoints onto a projection plane, wherein one viewpoint corresponds to a left eye of a viewer and the other viewpoint corresponds to a right eye of the viewer.

Referring to FIG. 4, in stereoscopic systems, a first rendering process may be used to generate a first 2D image 28 corresponding to a first viewpoint 12a (e.g., a viewpoint 12 corresponding to a left eye of a viewer) and a second rendering process may be used to generate a second 2D image 28 corresponding to a second viewpoint 12b (e.g., a viewpoint 12 corresponding to a right eye of a viewer). Because the first and second viewpoints 12a, 12b are spaced from each other, the respective first and second 2D images will typically be different. For example, in the illustrated embodiment, a first 2D image may show more of a left side 30 of a 3D model 26 and less of a right side 32 of the 3D model 26 than a second 2D image. To create a stereoscopic effect for a particular viewer in certain static cases, the first 2D image may be shown exclusively to his or her left eye while the second 2D image may be shown exclusively to his or her right eye. In other implementations, there may be a more dynamic operation where 2D images are changed in real time.

Figure 5:
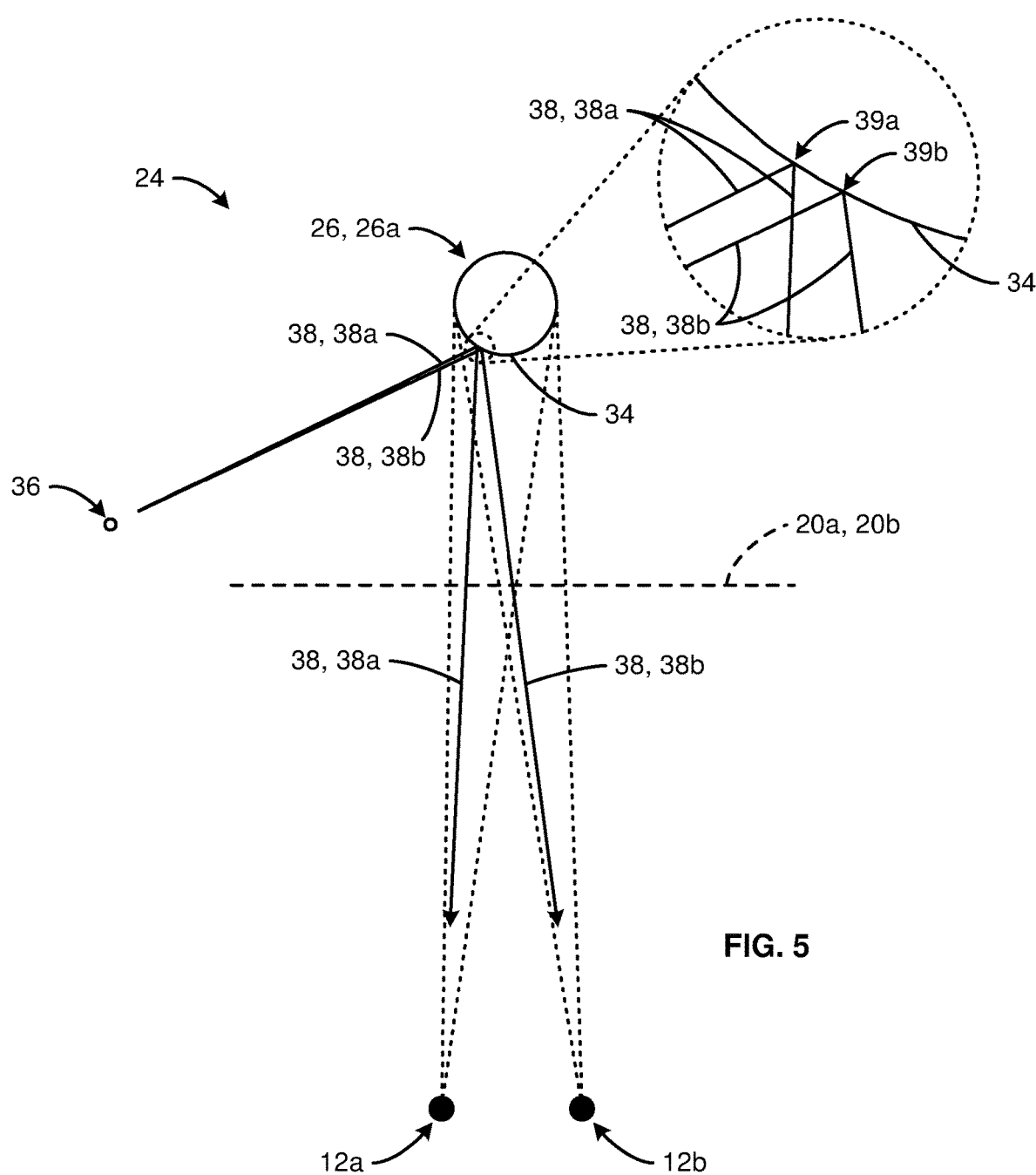
FIG. 5 is a schematic diagram of an alternative embodiment of a 3D model or model object projected from two viewpoints onto a projection plane, wherein the 3D model has at least one surface that is non-flat and reflects light from a light source toward the left and right eyes of a viewer.

Referring to FIG. 5, people are generally well accustomed to perceiving differences between visual inputs received via a left eye and visual inputs received via a right eye. Typically, people do not perceive visual inputs received via a left eye as being separate and distinct from visual inputs received via a right eye. That is, people generally do not typically perceive objects in double vision. Rather, a person's visual system fuses visual inputs received via a left eye and visual inputs received via a right eye together to create a single, composite view that has a sense of depth.

In certain situations, the differences between visual inputs received via a left eye and visual inputs received via a right eye may be so great that the person's visual system is unable to satisfactorily fuse them together into a single, composite view. In such situations, the source or sources of the visual disparity may become objects of visual focus. That is, when a person unintentionally senses a visual problem, the habitual response is often to shift visual focus to the source of the problem. Such focus is usually sufficient to resolve the visual problem, thereby freeing the user to direct visual focus elsewhere. However, in certain situations, the visual focus is unable to resolve the problem and the source of the problem may remain the visual focus for the user.

In certain environments, maintaining the visual focus of one or more human viewers on a visual problem may be exactly what is desired. For example, a "funhouse mirror" may include various convex and/or concave surfaces that specularly reflect light in ways that a human visual system cannot satisfactorily fuse the visual inputs received via a left eye and visual inputs received via a right eye. Accordingly, such mirrors may attract and maintain the visual focus of viewers.

In other environments, maintaining the visual focus of one or more human viewers on a visual problem may be undesirable. For example, in 3D video games, 3D motion pictures, 3D virtual reality experiences, and the like, it may be undesirable to have visual problems that attract visual focus. In these environments, rather than being an amusement, a visual problem may be a distraction, degrade the stereoscopic effect or experience, produce eye strain, produce dizziness, or just make a viewer feel that the virtual scene is "off" in some way.

In certain embodiments, non-flat surfaces (e.g., surfaces that are non-linear in at least one dimension, surfaces that are non-linear in at least one dimension and have a normal vector that is within a predetermined range of angles with respect to a viewing direction 18, surfaces that have at least a partial concave or convex curvature greater than a selected threshold in at least one dimension, or the like) that are reflective or refractive (e.g., that have a respective specular reflectivity or specular refractivity greater than a selected threshold) may be considered "special case" surfaces 34 that are sources of visual problems in 3D video games, 3D motion pictures, 3D virtual reality experiences, and the like. A mirrored or refractive tube may be an example of a special case surface 34 that is non-linear in one dimension. A mirrored or refractive Fresnel lens may be an example of a special case surface 34 that is non-linear in two dimensions. A clear, mirrored or partially reflective ball may be an example of a special case surface 34 that is non-linear in three dimensions.

Special case surfaces 34 may result in a greater disparity between what is rendered for a first viewpoint 12*a* and what is rendered for a second viewpoint 12*b* as visual features reflected by (or refracted through) a special case surface 34 may have locations on the special case surface 34 that are quite different for the two viewpoints 12*a*, 12*b*. Accordingly, if a stereoscopic display were to present an image corresponding to the first viewpoint 12*a* to a left eye of a viewer and an image corresponding to the second viewpoint 12*b* to a right eye of the viewer, the visual system of the viewer may be unable to satisfactorily fuse those images into a single, composite view.

The greater disparity corresponding to special case surfaces 34 may be caused by features (e.g., reflections) on those surfaces 34 being in different locations on the corresponding object 26 when viewed from the different viewpoints 12*a*, 12*b*. In contrast, features on non-special case surfaces may be fixed with respect to the corresponding object 26. For example, a 3D model 26 may represent a metal can 26*a*. A label on the metal can 26*a* may be fixed with respect to the can 26*a*. A viewpoint 12*a* corresponding to a left eye may see more or less of that label than a viewpoint 12*b* corresponding to a right eye, but the disparity between those two viewpoints 12*a*, 12*b* may be within a range that the human visual system is accustomed to handling. However, if the label were removed to reveal a metallic surface that is both curved and specularly reflective (i.e., is a special case surface 34), the 2D images 28 corresponding to the different viewpoints 12*a*, 12*b* may not see the can 26*a* so much as the reflections of other items (e.g., reflected objects, light, etc.) that are in a position and/or light in proximity to the can 26*a*.

For example, a light source 36 may be positioned near a can 26*a*. The light source 36 may not be within a viewing frustum 10*a*, 10*b* corresponding to either of two respective viewpoints 12*a*, 12*b*. Accordingly, the light source 36 may not be directly projected onto a projection plane 20*a*, 20*b*. However, light 38 proceeding from the light source 36 may specularly reflect off the can 26*a* in a manner that reaches those viewpoints 12*a*, 12*b*. Light 38*a* that reaches a first viewpoint 12*a* may travel a different path from light 38*b* that reaches a second viewpoint 12*b*. Moreover, light 38*a* that reaches the first viewpoint 12*a* may reflect off a different location on the can 26*a* than does the light 38*b* that reaches the second viewpoint 12*b*. That is, light 38*a* that reaches the first viewpoint 12*a* may reflect off a first location 39*a* on the can 26*a*, while light 38*a* that reaches the second viewpoint 12*b* may reflect off a second location 39*b* on the can 26*a*. The first location 39*b* may be spaced from the second location 39*b*. Accordingly, the light source 36 as seen in reflection at the first viewpoint 12*a* is not in the same location on the can 26*a* as the light source 36 as seen in reflection at the second viewpoint 12*b* or the light source may not even be seen at the second viewpoint 12*b*. Depending on various factors (e.g., curvature of the surface 34, specular reflectivity, specular refractivity, relative distance from the 3D model 26 to the viewpoints 12*a*, 12*b*, an angle between a normal vector corresponding to the surface 34 and a viewing direction 18, location of an origin of light 38 reflecting off or refracting through the 3D model 26, and the like), this "movement" of the reflection or refraction of a light source 36 may be sufficiently large that the viewer's visual system may be unable to satisfactorily fuse respective images into a single, composite view particularly in the portion of the area of disparate reflection.

Figure 6:
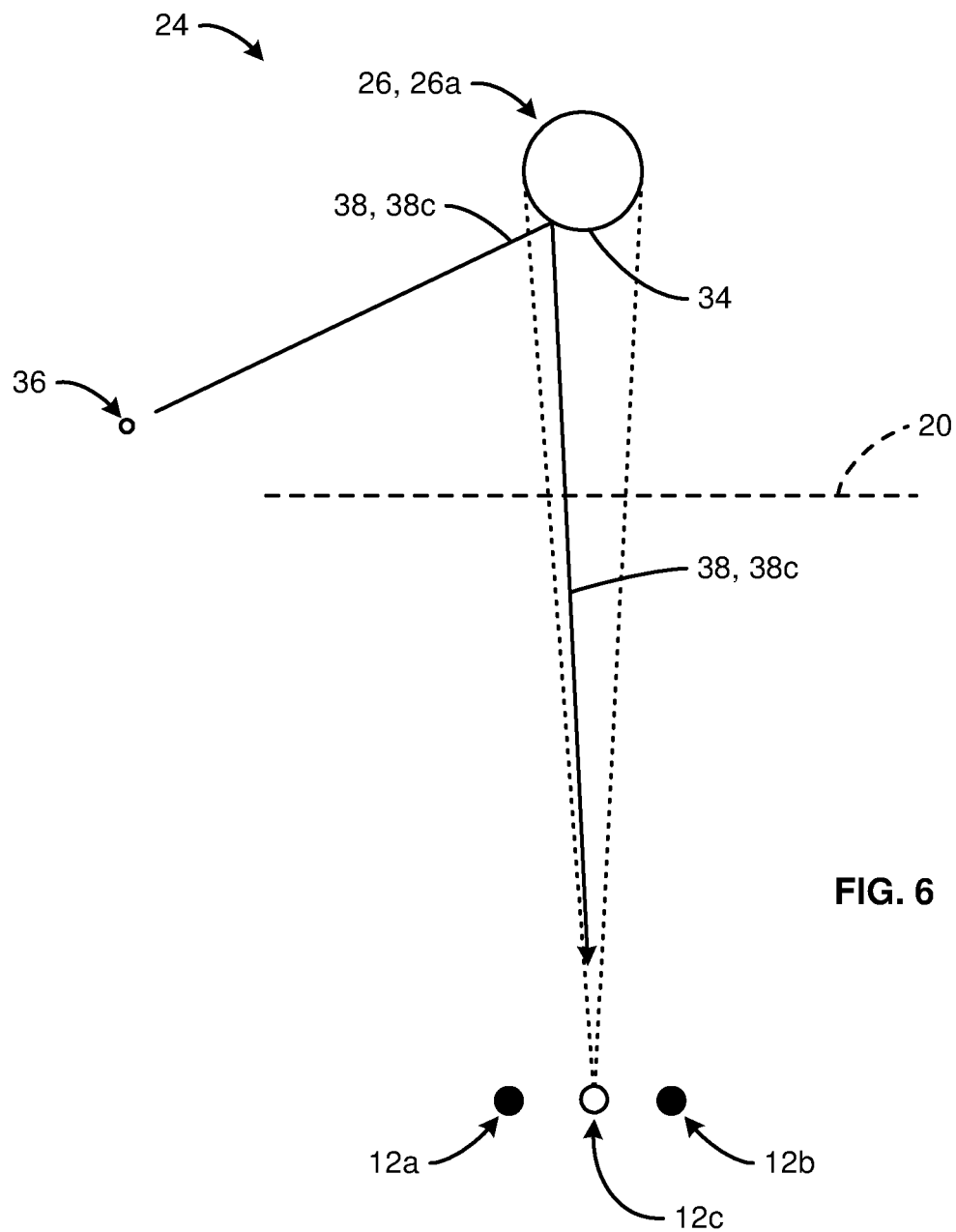
FIG. 6 is a schematic diagram of the 3D model of FIG. 5 projected from one viewpoint onto a projection plane, wherein the 3D model is reflecting light from the light source toward a "third eye" located midway between the left eye and the right eye of a viewer.
Figure 7:
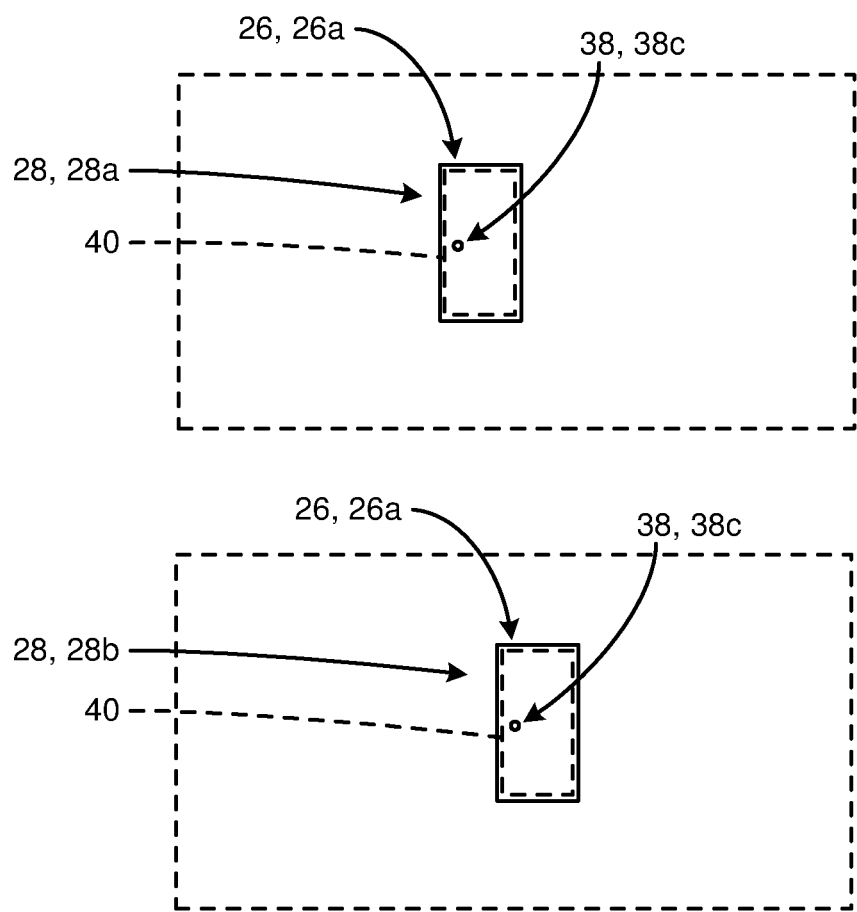
FIG. 7 is a schematic diagram of a left eye image and a right eye image wherein a texture of the 3D model of FIG. 5 (i.e., a texture corresponding to the viewpoint of a "third eye" located midway between the left eye and the right eye of a viewer) has been applied to both images.

Referring to FIGS. 6 and 7, in selected embodiments in accordance with the present invention, visual problems corresponding to special case surfaces 34 may be relieved or entirely removed by producing 2D images 28 where any special case surfaces 34 therewithin are depicted in the same way. That is, a first 2D image 28*a* may depict a 3D model 26 (e.g., a can 26*a*) as seen at a first viewpoint 12*a* and a second 2D image 28*b* may depict the 3D model 26 as seen at a second viewpoint 12*b*, but a depiction 40 of a special case surface 34 that extends across all or a portion of the 3D model 26 in both 2D images 28a, 28b may share the same source.

This may be accomplished in multiple ways. For example, a depiction 40 of a special case surface 34 of the 3D model 26 as seen at a first viewpoint 12a may be used in both a first image 28a and a second image 28b. Alternatively, a depiction 40 of a special case surface 34 of the 3D model 26 as seen at a second viewpoint 12b may be used in both a first image 28a and a second image 28b. In still other embodiments, a depiction 40 of a special case surface 34 of the 3D model 26 as seen at a third viewpoint 12c may be used in both a first image 28a and a second image 28b.

A third viewpoint 12c may be spaced from both a first viewpoint 12a and a second viewpoint 12b. Accordingly, light 38c that reaches a third viewpoint 12c may travel a different path from light 38a, 38b that reaches the first viewpoint 12a or the second viewpoint 12b. Moreover, light 38c that reaches a third viewpoint 12c may reflect off of or refract through a different location on a 3D model 26 than does the light 38a, 38b that reaches the first viewpoint 12a or the second viewpoint 12b. Accordingly, a light source 36 as seen in reflection at a third viewpoint 12c may not be in the same location on a 3D model 26 as the light source 36 as seen in reflection at the first viewpoint 12a or the second viewpoint 12b.

In certain embodiments, a third viewpoint 12c may be collinear with a first viewpoint 12a and a second viewpoint 12b and therefore shared as a common view to both viewpoints. Alternatively or in addition thereto, a third viewpoint 12c may be located between a first viewpoint 12a and a second viewpoint 12b. For example, in selected embodiments, a third viewpoint 12c may be located at a midpoint that is exactly between and collinear with the first and second viewpoints 12a, 12b. Accordingly, a depiction 40 of a special case surface 34 corresponding to a third viewpoint 12c may be different than a depiction of the special case surface 34 corresponding to the first viewpoint 12a and a depiction of the special case surface 34 corresponding to the second viewpoint 12b, but it may be equally close to both (e.g., something like an average of the two).

In selected embodiments, a special case surface 34 as seen at a first viewpoint 12a may have a different size and/or shape from the same special case surface 34 as seen at a second viewpoint 12b. Similarly, a special case surface 34 as seen at a third viewpoint 12c may have a different size and/or shape from the same special case surface 34 as seen at either a first viewpoint 12a or a second viewpoint 12b. Accordingly, it may not be possible or it may be undesirable to make the depiction 40 of a special case surface 34 identical in the 2D images 28a, 28b corresponding to the first and second viewpoints 12a, 12b.

While the depiction 40 of a special case surface 34 in the 2D images 28a, 28b may effectively share a common source or viewpoint 12c, it may not be identical in every dimension. For example, a depiction 40 corresponding to a third viewpoint 12c may, from the perspective of a human viewing it, appear to be stretched slightly in a first 2D image 28a and compressed slightly in a second 2D image 28b. However, because the depictions 40 corresponding to the 2D images 28a, 28b share a common origin (e.g., both correspond to the same viewpoint 12c), there may be significantly less disparity therebetween. That is, the disparity therebetween may be low enough that the special case surface 34 may be readily fused by the human brain and not become a visual problem or visual focus for a viewer.

Figure 8:
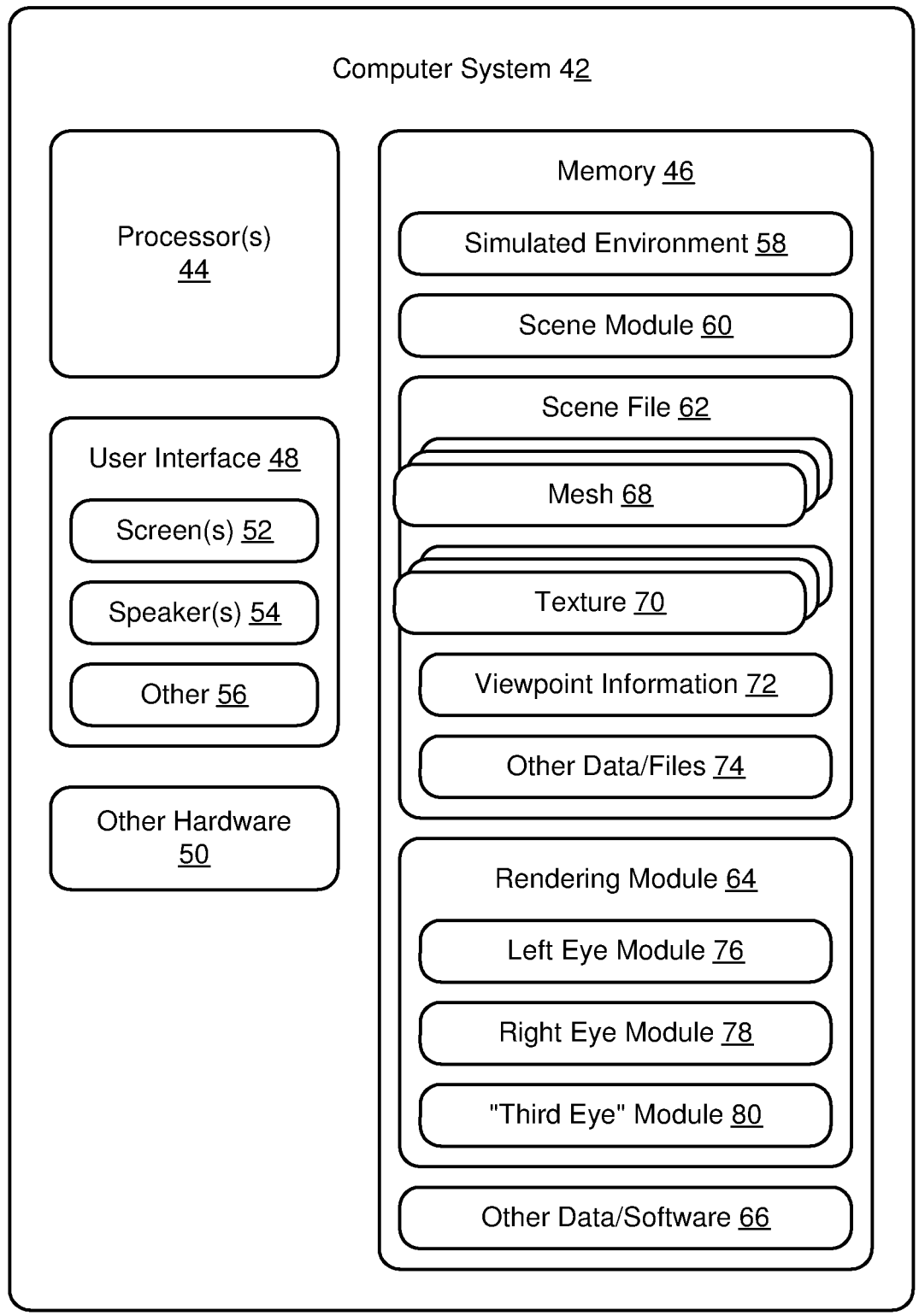
FIG. 8 is a schematic diagram of one embodiment of a computer system in accordance with the present invention.

Referring to FIG. 8, a computer system 42 in accordance with the present invention may operate in any suitable manner to depict special case surfaces 34 in stereoscopic images 28a, 28b using common source material in accordance with the present invention. For example, a computer system 42 may be embodied as hardware, software, or some combination thereof.

In selected embodiments, a computer system 42 may include computer hardware and computer software. The computer hardware of a computer system 42 may include one or more processors 44, memory 46, one or more user interfaces 48, other hardware 50, or the like or a combination or sub-combination thereof. In certain embodiments, all or some subset of this computer hardware may be hardware already included as part of a computer workstation, personal computer, video-game system, or the like. For example, all or some portion of the computer hardware may be multipurpose and perform tasks that are already associated with the operation of a personal computer. Alternatively, a computer system 42 may be dedicated substantially exclusively to rendering stereoscopic images in accordance with the present invention (e.g., pre-rendering stereoscopic images as part of the production of a 3D motion picture).

In certain embodiments, a computer system 42 may be or support a distributed computing environment or arrangement. Accordingly, a computer system 42 may comprise multiple computing devices that are connected via a computer network in a server-client relationship, peer-to-peer relationship, or some combination or hybrid thereof. In selected embodiments, a computer system 42 in accordance with the present invention may create stereoscopic images 28a, 28b for real-time use in a multiplayer online game.

Memory 46 (e.g., non-transitory computer-readable media) associated with a computer system 42 in accordance with the present invention may be operably connected to the one or more processors 44 and store the computer software (e.g., store the computer software as a computer-program product). This may enable the one or more processors 44 to execute the computer software. Memory 46 in the context of the present invention may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code in the form of computer-executable instructions or data structures and which can be accessed by a general purpose or special purpose computer.

A user interface 48 of a computer system 42 may enable one or more users of one or more types (e.g., engineers, technicians, animators, gamers, viewers, or the like) to interact with, run, customize, or control various aspects of a computer system 42. A user interface 48 may enable a user to manually control (e.g., select, type in, incrementally increase or decrease at the touch of a button or twist of a knob) and/or orally control (e.g., issue one or more commands or requests using his or her voice) one or more operations of a computer system 42. In selected embodiments, a user interface 48 of a computer system 42 may include one or more display screens 52, buttons, switches, knobs, keypads, keyboards, game controllers, touch screens, pointing devices, microphones, speakers 54, some other input and/or output device 56, or the like or a combination or sub-combination thereof.

In selected embodiments, memory 46 associated with a computer system 42 may store (at least temporarily) one or more simulated environments 58, scene modules 60, scene files 62, rendering modules 64, other data or software modules 66, or the like or a combination or sub-combination thereof. A simulated environment 58 may be a 3D model space 24 into which one or more 3D models 26 or model objects 26 have been placed. A scene module 60 may determine what is to be included in various virtual scenes of a simulated environment 58. In certain embodiments, a scene module 62 may use model culling to separate 3D models 26 that are completely outside of one or more viewing frustums 10 from 3D models 26 that are at least partially inside of one or more viewing frustums 10.

A scene module 60 may create or prepare one or more scene files 62. A scene file 62 may contain whatever data, files, information, or other inputs are needed by a rendering module 64 to render at least one 2D image 28 of a virtual scene. In certain embodiments, a scene module 60 may create or prepare a scene file 62 for each viewpoint 12. Accordingly, a scene module 60 may create or prepare a first scene file 62 corresponding to a left eye viewpoint 12a and a second scene file 62 corresponding to a right eye viewpoint 12b. Alternatively, a scene module 60 may create or prepare a scene file 62 containing the data, files, information, or other inputs needed by a rendering module 64 to render stereoscopic 2D images 28a, 28b.

In selected embodiments, a scene file 62 may contain and/or point to information defining one or more 3D models 26 (e.g., information defining one or more meshes 68, information defining one or more textures 70, information tagging or otherwise linking one or more surfaces of one meshes 68 with one or more textures 70), viewpoint information 72 (e.g., information locating a left eye viewpoint 12a and/or a right eye viewpoint 12b with respect to the one or more 3D models 26), other data or files as desired or necessary, or the like or a combination or sub-combination thereof.

A rendering module 64 may receive or operate on one or more scene files 62 and output one or more 2D images 28. In selected embodiments, a rendering module 64 may comprise a left eye module 76, a right eye module 78, a third eye module 80, or the like or a combination or sub-combination thereof. A left eye module 76 may receive or operate on a scene file 62 and output a 2D image 28a or 2D image data corresponding to a first viewpoint 12a (e.g., a viewpoint 12 corresponding to a left eye). A right eye module 78 may receive or operate on a scene file 62 and output a 2D image 28b or 2D image data corresponding to a second viewpoint 12b (e.g., a viewpoint 12 corresponding to a right eye). A third eye module 80 may receive or operate on a scene file 62 and output a 2D image 28 or 2D image data corresponding to a third viewpoint 12c.

In selected embodiments, a render module 64 may determine when one or more special case surfaces 34 (e.g., one or more special case surfaces 34 of at least a threshold size relative to a projection plane 20) will be present in both 2D images 28a, 28b or scenes. When a special case surface 34 will be present in both, a third eye module 80 may render a depiction 40 (i.e., a 2D image 28 of the special case surface 34 corresponding to the third viewpoint 12c) that may be incorporated into a 2D image 28a corresponding to a first (e.g., left) eye of a viewer and a 2D image 28b corresponding to a second (e.g., right) eye of the viewer. This incorporation may be more than a simple "cut and paste" of the depiction 40 into the other 2D images 28a, 28b. For example, the incorporation may include a determination on a per-fragment basis whether a particular fragment (e.g., a particular pixel) will correspond to a first viewpoint 12a, a second viewpoint 12b, a third viewpoint 12c, or some mixture (e.g., weighted average) thereof.

In most applications of a system 42 in accordance with the present invention, a simulated environment 58 may rarely be static. Whether one or more viewpoints 12 are moving with respect to one or more 3D models 26, one or more 3D models 26 are moving with respect to one or more viewpoints 12, or one or more 3D models 26 are moving with respect to one another, virtual scenes may be substantially continuously changing. Accordingly, in typically usage, a scene module 60 may create or produce a steady stream of scene files 62 and a rendering module 64 may receive or operate on each of those scene files 62 in order to output a steady stream of stereoscopic images 28a, 28b.

In selected embodiments, the rendering performed by a rendering module 64 may be completed in real time. Accordingly, a system 42 may support real time interactivity in a 3D video game, a 3D virtual reality experience, or the like. Alternatively, the rendering performed by a rendering module 64 may be completed in advance. Accordingly, in certain embodiments, a system 42 may support a predetermined viewing experience like a 3D motion picture, a 3D ride or activity at an amusement park, or the like.

Figure 9:
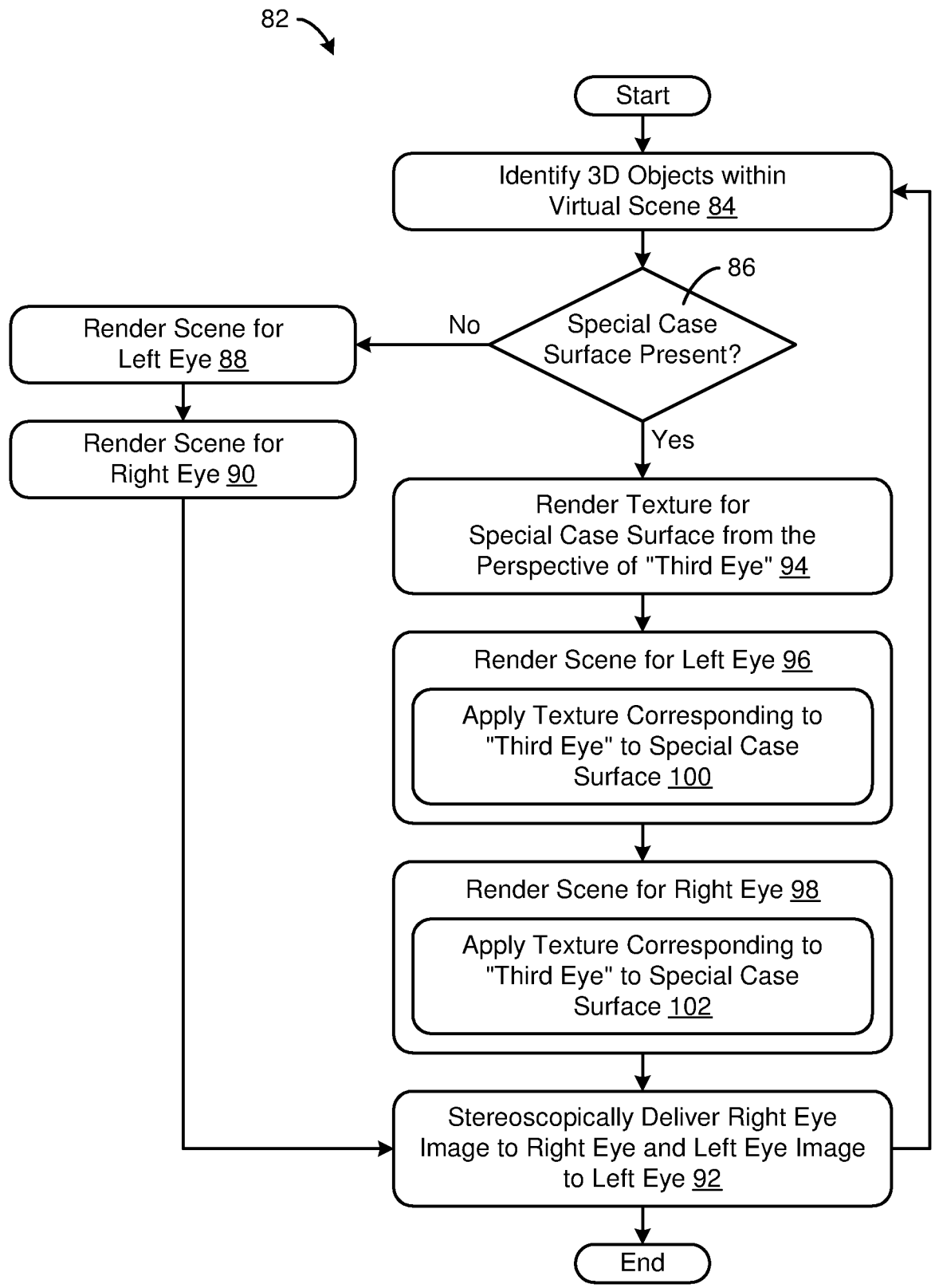
FIG. 9 is a schematic diagram of one embodiment of a method of real-time rendering in accordance with the present invention.

Referring to FIG. 9, a method 82 in accordance with the present invention may enable or support real time rendering of stereoscopic images 28a, 28b. In selected embodiments, such a method 82 may include identifying 84 one or more 3D models 26 or model objects 26 to be included within a particular virtual scene. This may be accomplished by defining first and second viewing frustums 10a, 10b and determining which 3D models 26 are at least partially included within at least one such viewing frustum 10a, 10b. Thereafter, a determination 86 may be made as to whether any special case surfaces 34 are present (i.e., visible and of at least a threshold size) in both viewing frustums 10a, 10b.

If no special case surface 34 is present in either viewing frustum 10a, 10b (or if one or more special case surfaces 34 are present, but too small or only in one viewing frustum 10a, 10b), then the virtual scene may be rendered 88 to produce a first 2D image 28a for a left eye and rendered 90 to produce a second 2D image 28b for a right eye. The first and second 2D images 28a, 28b may then be stereoscopically delivered 92 or presented 92 to a human viewer. The viewer may therefore experience or perceive the virtual scene in three dimensions.

If one or more special case surfaces 34 are present in both viewing frustums 10a, 10b, then a depiction 40 (e.g., a texture) for each special case surface 34 may be rendered 94 from the perspective of a third viewpoint 12c. In selected embodiments, the location of a third viewpoint 12c may be selected according to a simple formula. For example, a third viewpoint 12c may always be a point midway between a first viewpoint 12a and a second viewpoint 12b. Alternatively, different contextual situations may result in a third viewpoint 12c being located in different locations.

For example, if a viewpoint 12 of a viewer were moving to the left with respect to one or more 3D models 26, a third viewpoint 12c may move away from a midpoint to the left (e.g., a third viewpoint 12c may move toward or become a first viewpoint 12a). Conversely, if a viewpoint 12 of a viewer were moving to the right with respect to one or more 3D models 26, a third viewpoint 12c may move away from a midpoint to the right (e.g., a third viewpoint 12c may move toward or become a second viewpoint 12b). In selected embodiments, a location of a third viewpoint 12c may be determined via a look-up table. Accordingly, direction of relative motion, speed of relative motion, various other factors, or the like may determine a location of a third viewpoint 12c.

When a virtual scene is rendered 96 to produce a first 2D image 28a for a left eye and rendered 98 to produce a second 2D image 28b for a right eye, the rendering 96, 98 may include applying 100, 102 to each special case surface 34 therewithin a depiction 40 corresponding to a third viewpoint 12c. Although the applying 100, 102 may visually or effectively result in different stretching, compressing, or skewing of a depiction 40 to fit the special case surfaces 34 in the first and second 2D images 28a, 28b, there may be significantly less disparity between the first and second 2D images 28a, 28b than would otherwise be present. Moreover, the disparity between the first and second 2D images 28a, 28b may be low enough that the special case surfaces 34 therewithin may be readily fused by the human viewer and not become visual problems for a viewer when those images 28a, 28b are stereoscopically delivered 92 or presented 92 to him or her.

Various steps of the method 82 may be rapidly repeated in order to produce a steady stream of stereoscopic images 28a, 28b. The rate at which stereoscopic images are produced may be selected to provide a desired viewing quality (e.g., a desired frame rate for each eye of a viewer).

Figure 10:
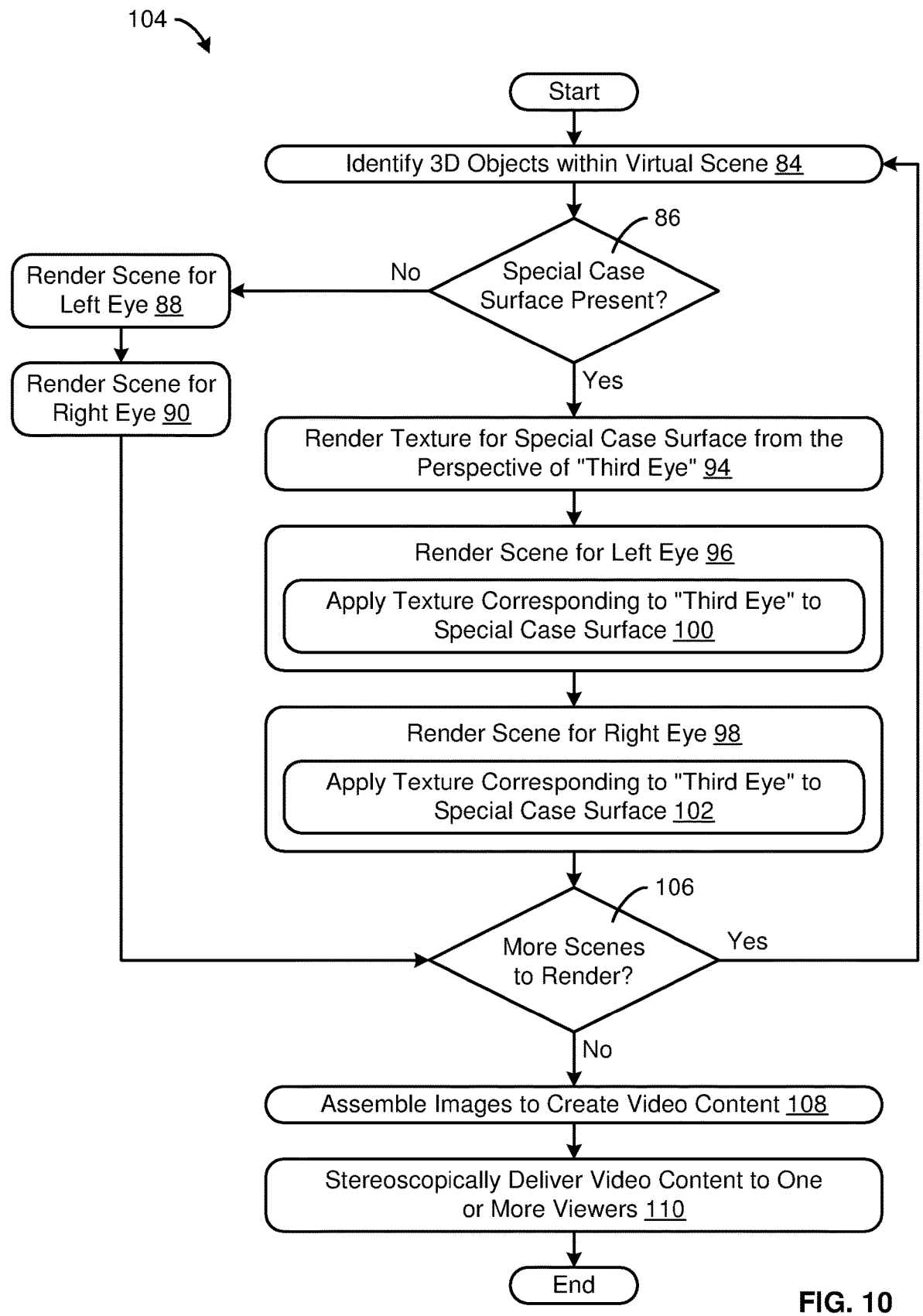
FIG. 10 is a schematic diagram of one embodiment of a method of pre-rendering in accordance with the present invention.

Referring to FIG. 10, a method 104 in accordance with the present invention may enable or support pre-rendering of stereoscopic images 28a, 28b. In selected embodiments, such a method 104 may include identifying 84 one or more 3D models 26 or model objects 26 to be included within a particular virtual scene. As noted hereinabove, this may be accomplished by defining first and second viewing frustums 10a, 10b and determining which 3D models 26 are at least partially included within at least one such viewing frustum 10a, 10b. Thereafter, a determination 86 may be made as to whether any special case surfaces 34 are present in both viewing frustums 10a, 10b.

If no special case surface 34 is present in either viewing frustum 10a, 10b (or if one or more special case surfaces 34 are present, but too small in size or only in one viewing frustum 10a, 10b), then the virtual scene may be rendered 88 to produce a first 2D image 28a for a left eye and rendered 90 to produce a second 2D image 28b for a right eye. A determination 106 may then be made as to whether more scenes need to be rendered. If no more scenes need to be rendered, then the various 2D images 28a, 28b that were produced may be assembled 108 to create video content. Thereafter, the video content may be stereoscopically delivered 110 or presented 110 to one or more human viewers. On the other hand, if more scenes need to be rendered, then various steps of the method 104 may be repeated in order to produce additional stereoscopic images 28a, 28b.

If it is determined 86 that one or more special case surfaces 34 are present in both viewing frustums 10a, 10b, then a location of a third viewpoint 12c may be determined and a depiction 40 (e.g., a texture) for each special case surface 34 may be rendered 94 from the perspective of the third viewpoint 12c. Accordingly, when the virtual scene is rendered 96 to produce a first 2D image 28a for a left eye and rendered 98 to produce a second 2D image 28b for a right eye, the rendering 96, 98 may include applying 100, 102 each depiction 40 to the corresponding special case surface 34. As noted hereinabove, although the applying 100, 102 may visually or effectively result in different stretching, compressing, or skewing of a depiction 40 to fit the special case surfaces 34 in the first and second 2D images 28a, 28b, there may be significantly less disparity than there would otherwise be present.

Once the rendering 96, 98 is complete, various steps of the method 104 may be repeated in order to produce additional stereoscopic images 28a, 28b, assemble 108 images 28a, 28b to create video content, stereoscopically deliver 110 or present 110 video content to one or more human viewers, or the like.

The flowcharts in FIGS. 9 and 10 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block and/or combinations of blocks may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively or in addition thereto, certain steps or functions may be omitted if not needed.

Figure 11:
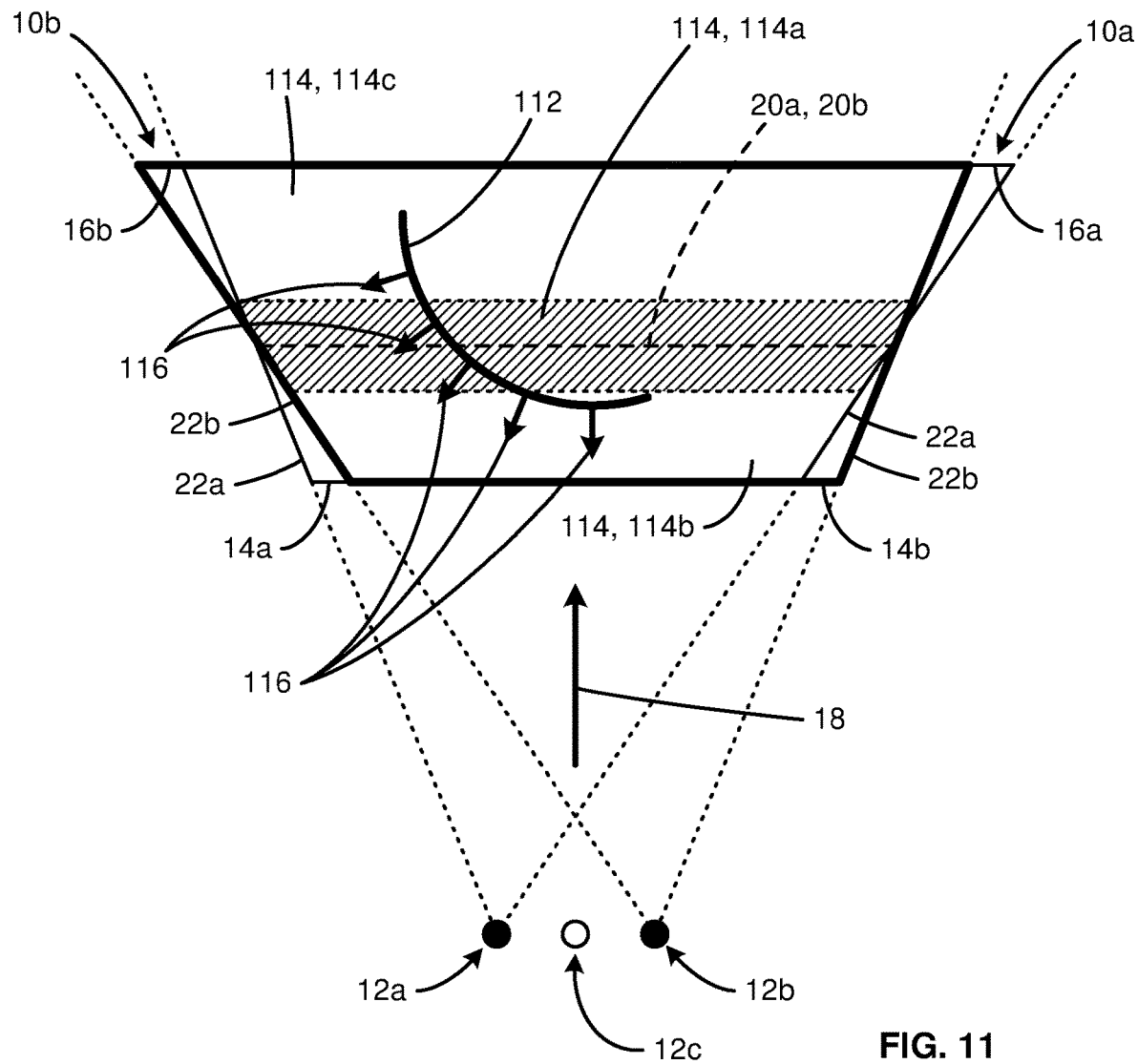
FIG. 11 is a schematic diagram of two viewing frustums that share a common region divided into different zone based on the relative parallax corresponding thereto.

Referring to FIG. 11, in selected embodiments, determinations regarding whether a particular surface 112 or a particular portion of a surface 112 should be depicted as seen from a third viewpoint 12c (i.e., should be considered a special case surface 34) may be based on one or more factors. As noted above, curvature in at least one dimension, reflectivity above a selected threshold (e.g., specular reflectivity above zero or some other value on a scale from zero to one where zero corresponds to reflection that is completely diffuse and one corresponds to reflection that is completely specular), and refractivity above a selected threshold (e.g., specular refractivity above zero or some other value on a scale from zero to one where zero corresponds to refraction that is completely diffuse and one corresponds to refraction that is completely specular) are three such factors. Another factor may be a location of a portion of a surface 112 at issue.

That is, a viewing frustum 10 or an area common to two viewing frustums 10a, 10b may be divided into multiple zones 114. For example, a first zone 114a may correspond to a region of relatively low disparity as between corresponding objects from the left eye—right eye viewpoints. In selected embodiments or situations, a first zone 114a may surround a projection plane 20a, 20b. A second zone 114b may be located on a near side (closer to the viewpoints 12a and 12b) of a first zone 114a. A third zone 114c may be located on a far side (further away from the viewpoints 12a and 12b) of a first zone 114a.

A second zone 114b and/or a third zone 114c may be a region of higher or relatively high disparity when compared to a first zone as between corresponding objects from the left eye—right eye viewpoints 114a. Due to negative and positive parallax in the respective second and third zones 114b, 114c, being located within the second or third zone 114b, 114c may be a factor weighing in favor of a portion of a surface 112 that is curved being consider a special case surface 34. Conversely, being located within the first zone 114a may be a factor weighing against a portion of a surface 112 that is curved being consider a special case surface 34.

Another factor that may be considered when determining whether a particular surface 112 or a particular portion of a surface 112 should be considered a special case surface 34 may be an orientation of the surface 112 or of the portion of the surface 112 with respect to a viewing direction 18. For example, every portion or segment of a particular surface 112 may have or define a normal vector 116 corresponding thereto. A normal vector 116 may be perpendicular to the surface 112 at a given point on that surface 112. Accordingly, for a particular portion of a surface 112, having a normal vector 116 that is within a predetermined range of angles with respect to a viewing direction 18 may be a factor weighing in favor of that portion being considered a special case surface 34. In selected embodiments, the relative angle between a viewing direction 18 and a particular normal vector 116 may be measured in an xy-plane, an yz-plane, and/or a xz-plane.

Figure 12:
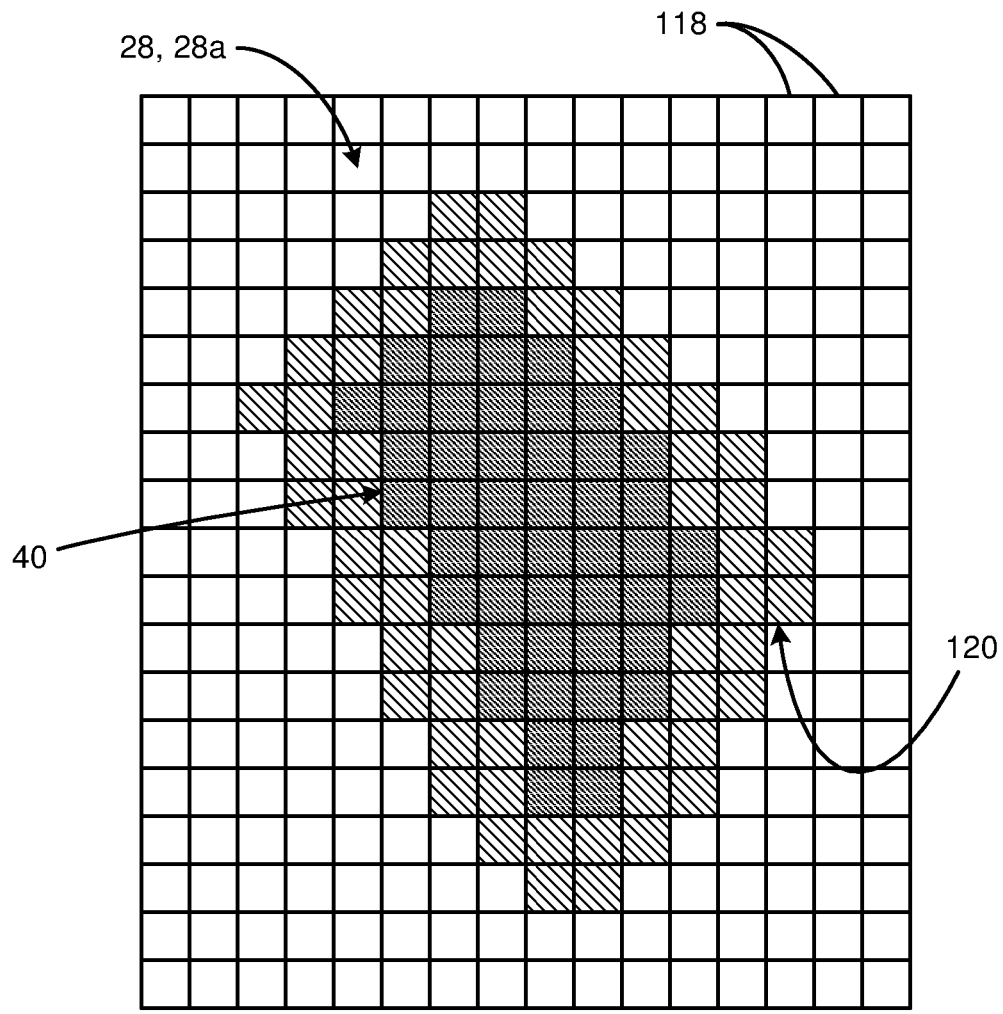
FIG. 12 is a schematic diagram of a left eye image wherein a texture corresponding to the viewpoint of a "third eye" has been incorporated therewithin.

Referring to FIG. 12, the incorporation of a depiction 40 corresponding to a third viewpoint 12c may be accomplished on a per-fragment basis. In selected embodiments, when rendering a 2D image 28a corresponding to a first viewpoint 12a, a determination may be made for each fragment 118 thereof whether that fragment 118 will correspond to a first viewpoint 12a, a third viewpoint 12c, or some mixture (e.g., weighted average) thereof. Similarly, when rendering a 2D image 28b corresponding to a second viewpoint 12b, a determination may be made for each fragment 118 thereof whether that fragment 118 will correspond to a second viewpoint 12b, a third viewpoint 12c, or some mixture (e.g., weighted average) thereof.

A fragment 118 may be a subset of a 2D image 28. In certain embodiments, a fragment 118 may be a single pixel. Accordingly, determinations regarding whether a particular surface 112 or a portion of a surface 112 should be depicted from a third viewpoint 12c may be determined on a pixel-by-pixel basis.

When making determinations on a per-fragment basis, abrupt changes where one fragment 118 corresponds to a first (or second) viewpoint 12a and an adjacent fragment 118 corresponds to a third viewpoint 12c may produce undesirable visual artifacts. Accordingly, in selected embodiments, transitions from a first (or second) viewpoint 12a to a third viewpoint 12c may occur gradually over multiple fragments 118 so as to ease or smooth a visual transition from one to the other.

For example, FIG. 12 provides a schematic illustration of a simplistic 2D image 28a that may be delivered to a left eye of a human viewer. The illustration is divided into a two-dimensional array of fragments 118. Because this illustration corresponds to a left eye, many of the fragments 118 are rendered for a first viewpoint 12a. (If the illustration corresponded to a right eye, those fragments 118 would be rendered for a second viewpoint 12b.) Certain other fragments 118 are rendered for a third viewpoint 12c. Between the fragments 118 rendered for the first viewpoint 12a and the fragments 118 rendered for the third viewpoint 12c may be a buffer zone 120 comprising buffer fragments 118 that are rendered for a modified first viewpoint.

A modified first viewpoint may not correspond wholly to a first viewpoint 12a nor to a third viewpoint 12c, but rather something between the first viewpoint 12a and the third viewpoint 12c. Buffer fragments 118 nearest fragments 118 rendered for a first viewpoint 12a may correspond more to the first viewpoint 12a than to the third viewpoint 12c. Conversely, buffer fragments 118 nearest fragments 118 rendered for a third viewpoint 12c may correspond more to the third viewpoint 12c than to the first viewpoint 12a.

Accordingly, buffer fragments 118 may ease or smooth a visual transition from a first or second viewpoint 12a, 12b to a third viewpoint 12c.

One way to visualize the effect of buffer fragments 118 may be to envision a first viewpoint 12a migrating toward a third viewpoint 12c during progression from one fragment 118 to another across a buffer zone 120. That is, on one side (e.g., an outside) of selected buffer fragments 118 may be fragments 118 rendered for a first viewpoint 12a. On the other side (e.g., an inside) of the buffer fragments 118 may be fragments rendered for the third viewpoint 12c. Accordingly, a first (e.g., an outer) layer of a buffer zone 120 may comprise fragments 118 rendered for a viewpoint 12 that is shifted one increment away from the first viewpoint 12a and toward the third viewpoint 12c, a second layer of a buffer zone 120 may comprise fragments 118 rendered for a viewpoint that is shifted two increments away from the first viewpoint 12a and toward the third viewpoint 12c, etc. A last (e.g., an inner) layer of the buffer zone 120 may comprise fragments 118 rendered for a viewpoint 12 that is only one increment away from the third viewpoint 12c.

In actual implementation, use of a buffer zone 120 may not require rendering fragments 118 for numerous viewpoints 12, but the visual effect may be similar. For example, in selected embodiments, a buffer fragment 118 may have a color that is a weighted average of the color it would have if it were rendered for a first (or second) viewpoint 12a and the color it would have if it were rendered for a third viewpoint 12c. The weighting may change during progression from one fragment 118 to another fragment 118 across a buffer zone 120. Accordingly, the color of a buffer fragment 118 on one side of a buffer zone 120 may be weighted in favor of the first (or second) viewpoint 12a, while the color of a buffer fragment 118 on the other side of a buffer zone 120 may be weighted in favor of the third viewpoint 12c.

References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Such phrases are not necessarily referring to the same embodiment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A computer program product tangibly embodied in a non-transitory computer readable medium, comprising instructions to cause one or more processors to:
   identify a surface of at least one virtual object included within a virtual scene of a 3D model space;
   render a first image of the virtual scene based on a first projection corresponding to a first viewpoint, wherein the first viewpoint corresponds to a left eye in a stereo display;
   render a second image of the virtual scene based on a second projection corresponding to a second viewpoint that is spaced from the first viewpoint, wherein the second viewpoint corresponds to a right eye in the stereo display;

render a texture for the surface based on a third projection corresponding to a third viewpoint that is spaced from both the first viewpoint and the second viewpoint;

apply, as part of rendering the first image, the texture to the first image so that the surface as seen in the first image is from the third viewpoint; and apply, as part of rendering the second image, the texture to the second image so that the surface as seen in the second image is from the third viewpoint.

2. The computer program product of claim 1, wherein the surface corresponds to all or a portion of the virtual object and is defined in the 3D model space as being specularly reflective or specularly refractive.

3. The computer program product of claim 2, wherein a mesh of the surface in the 3D model space is non-linear in at least one dimension.

4. The computer system of claim 3, wherein the surface is represented by at least one pixel in the first image and at least one pixel in the second image.

5. The computer program product of claim 4, wherein a distance between the first viewpoint and the second viewpoint matches a representative human interocular distance.

6. The computer program product of claim 5, wherein the third viewpoint is located between the first viewpoint and the second viewpoint.

7. The computer program product of claim 6, wherein the instructions further cause the one or more processors to stereoscopically display the first image and the second image to respective right and left eyes of a human viewer.

8. A computer program product tangibly embodied in a non-transitory computer readable medium, comprising instructions to cause one or more processors to:

generate stereoscopic images of one or more virtual objects within a 3D model space; and render, as part of the generation of the stereoscopic images, special case surfaces in a special manner, wherein (1) each special case surface of the special case surfaces is a surface of the one or more virtual objects that is both non-linear in at least one dimension and above a specular reflectivity or refractivity threshold and (2) the special manner comprises rendering a first image of the one or more virtual objects based on a first projection corresponding to a first viewpoint, wherein the first viewpoint corresponds to a left eye in a stereo display, rendering a second image of the one or more virtual objects based on a second projection corresponding to a second viewpoint that is spaced from the first viewpoint, wherein the second viewpoint corresponds to a right eye in the stereo display, rendering a texture for the surface based on a third projection corresponding to a third viewpoint that is spaced from both the first viewpoint and the second viewpoint, applying, as part of the rendering the first image, the texture to the first image so that the surface as seen in the first image is from the third viewpoint, and applying, as part of the rendering the second image, the texture to the second image so that the surface as seen in the second image is from the third viewpoint.

9. The computer program product of claim 8, wherein a distance between the first viewpoint and the second viewpoint matches a representative human interocular distance.

10. The computer program product of claim 9, wherein the first viewpoint, second viewpoint, and third viewpoint are collinear.

11. The computer program product of claim 10, wherein the third viewpoint is located halfway between the first viewpoint and the second viewpoint.

12. The computer program product of claim 11, wherein the instructions further cause the one or more processors to stereoscopically display the stereoscopic images to a human viewer.

13. The computer program product of claim 12, wherein the stereoscopic images comprise:

the first image with the surface having the texture from the third projection; and the second image with the surface having the texture from the third projection.

14. A computer system comprising:

one or more processors;

memory operably connected to the one or more processors; and the memory storing programming that, when executed by the one or more processors, causes the computer system to render a first image of a virtual scene based on a first projection corresponding to a first viewpoint, wherein the first viewpoint corresponds to a left eye in a stereo display, render a second image of the virtual scene based on a second projection corresponding to a second viewpoint that is spaced from the first viewpoint, wherein the second viewpoint corresponds to a right eye in the stereo display, render a texture for a virtual object within the virtual scene based on a third projection corresponding to a third viewpoint that is spaced from both the first viewpoint and the second viewpoint, apply, as part of rendering the first image, the texture to the first image so that at least a portion of the virtual object as seen in the first image is from the third viewpoint, and apply, as part of rendering the second image, the texture to the second image so that at least a portion of the virtual object as seen in the second image is from the third viewpoint.

15. The computer system of claim 14, wherein the memory stores a tag tagging the at least a portion of the virtual object with a specularly reflective surface or a specularly refractive surface.

16. The computer system of claim 15, wherein the memory stores a mesh of the at least the portion of the virtual object and the mesh is non-linear in at least one dimension.

17. The computer system of claim 14, wherein the at least a portion of the virtual object is a surface thereof that is non-linear in at least one dimension and specularly reflective or refractive.

18. The computer system of claim 17, wherein a distance between the first viewpoint and the second viewpoint matches a representative human interocular distance.

19. The computer system of claim 18, wherein the first viewpoint, second viewpoint, and third viewpoint are collinear.

20. The computer system of claim 19, wherein the third viewpoint is located halfway between the first viewpoint and the second viewpoint.

* * * * *